(12) United States Patent
Xia et al.

(10) Patent No.: US 8,401,395 B2
(45) Date of Patent: Mar. 19, 2013

(54) FREE SPACE OPTICS BROADBAND HOME NETWORK

(75) Inventors: Tiejun Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 337 days.

(21) Appl. No.: 12/619,206

(22) Filed: Nov. 16, 2009

(65) Prior Publication Data

US 2011/0116805 A1    May 19, 2011

(51) Int. Cl.
*H04B 10/00*    (2006.01)

(52) U.S. Cl. ........ 398/131; 398/128; 398/129; 398/130; 398/118; 398/122; 398/126; 398/127; 398/135; 398/136

(58) Field of Classification Search .......... 398/130, 398/131, 128, 129, 135, 136, 115, 116, 117, 398/118, 121, 125, 124, 202, 173, 175, 176, 398/177, 178, 183, 182, 208, 209, 200, 201, 398/127, 126, 122

See application file for complete search history.

(56) References Cited

U.S. PATENT DOCUMENTS

| | | | | |
|---|---|---|---|---|
| 4,627,106 A * | 12/1986 | Drake | .......................... | 398/131 |
| 4,727,600 A * | 2/1988 | Avakian | ........................ | 398/126 |
| 4,977,618 A * | 12/1990 | Allen | ............................ | 398/127 |
| 5,119,226 A * | 6/1992 | Allen et al. | ..................... | 398/127 |
| 5,726,786 A * | 3/1998 | Heflinger | ....................... | 398/128 |
| 5,986,787 A * | 11/1999 | Ohshima et al. | ............. | 398/127 |
| 7,751,716 B2 * | 7/2010 | Killinger | ....................... | 398/129 |

* cited by examiner

*Primary Examiner* — Hanh Phan

(57) ABSTRACT

A system comprises a transmitter including a laser configured to generate a laser beam directed at a spot on a surface, and a laser driver connected to the laser and configured to modulate input data onto the laser beam. The system may further comprise a receiver including an optical detector configured to decode received light into raw data, a signal processor configured to decode the raw data into the original input data, and telescope optics configured to receive light reflected from the spot on the surface, collimate the light and converge the light onto the optical detector.

24 Claims, 12 Drawing Sheets

FREE SPACE OPTICS BROADBAND HOME NETWORK

BACKGROUND

Communications services may allow for a local network to communicate with an outside network. Previously, many local networks have been internally wired with technologies of relatively high bandwidth compared to the bandwidth of their connection to the outside network. For example, a premises network of 10baseT Ethernet may have been connected to an external network through a 56 k modem or ISDN connection. Accordingly, such premises networks may have been bandwidth-limited by their connection to the outside network.

Due to the increased prevalence of broadband connections, such as fiber-to-the-premises broadband services, in-premises wireless networks may now may be a bottleneck with regard to broadband services. Particularly, high definition video data may be especially taxing to an in-premises network due to the broad bandwidth required for the transmission of such video data. As an example, if three video devices in a home each require a 150 Mb/second network stream to operate, then a 500 Mb/sec premises network may be required to allow for each of the three video devices to be used simultaneously.

In some installations, unsightly coaxial cable may be laid in a premises. However, this approach has drawbacks, such as that a video device must be close to a cable outlet and that it may be difficult, inconvenient, and expensive to add an outlet. Additionally, existing wireless systems may lack sufficient bandwidth for multiple video data streams, and higher bandwidth wireless systems may be overly susceptible to interference from other wireless devices, such as cellular telephones.

DETAILED DESCRIPTION

A free space optical system may be used to provide broadband services at a relatively high bandwidth and substantially free from electromagnetic interference. For example, a free-space optical system may be used in an in-premises network to provide high-bandwidth capabilities within the premises. As another example, a free-space optical system may be used between premises to provide a high-bandwidth connection between premises.

In some free space optical installations, wavefronts may be transmitted through the air over a clear line-of-sight path between a laser beam projector and a receiver. To facilitate transmission in such systems, the free space laser beam projector and receiver may be selectively positioned to face one another so as to form an information link. In these installations, fine optical alignment adjustments may be required in order to provide a quality free space path from the laser beam projector to the receiver. Accordingly, line-of-sight pathways and precise alignment may be necessary for such a free space optical installation, both of which may be difficult to provide for and maintain in an in-premises networking environment.

Rather than being optically aligned to a particular receiver, the laser beam projector may instead direct a modulated laser beam at a surface of a structure, such as a tabletop, a wall, a ceiling, or a floor. A receiver may use telescope optics to focus on the surface at a location substantially where the modulated laser beam may be directed. The receiver may accordingly detect a portion of the light of the modulated laser beam reflected off the surface, and may thus decode the modulated data for use or for further transmission. Such an approach has the advantages of avoiding long cable runs, providing for a broadband connection with substantial bandwidth, having freedom from electromagnetic interference, and having an ability to be set up without maintaining a precise transmitter-to-receiver optical alignment.

Figure 1:
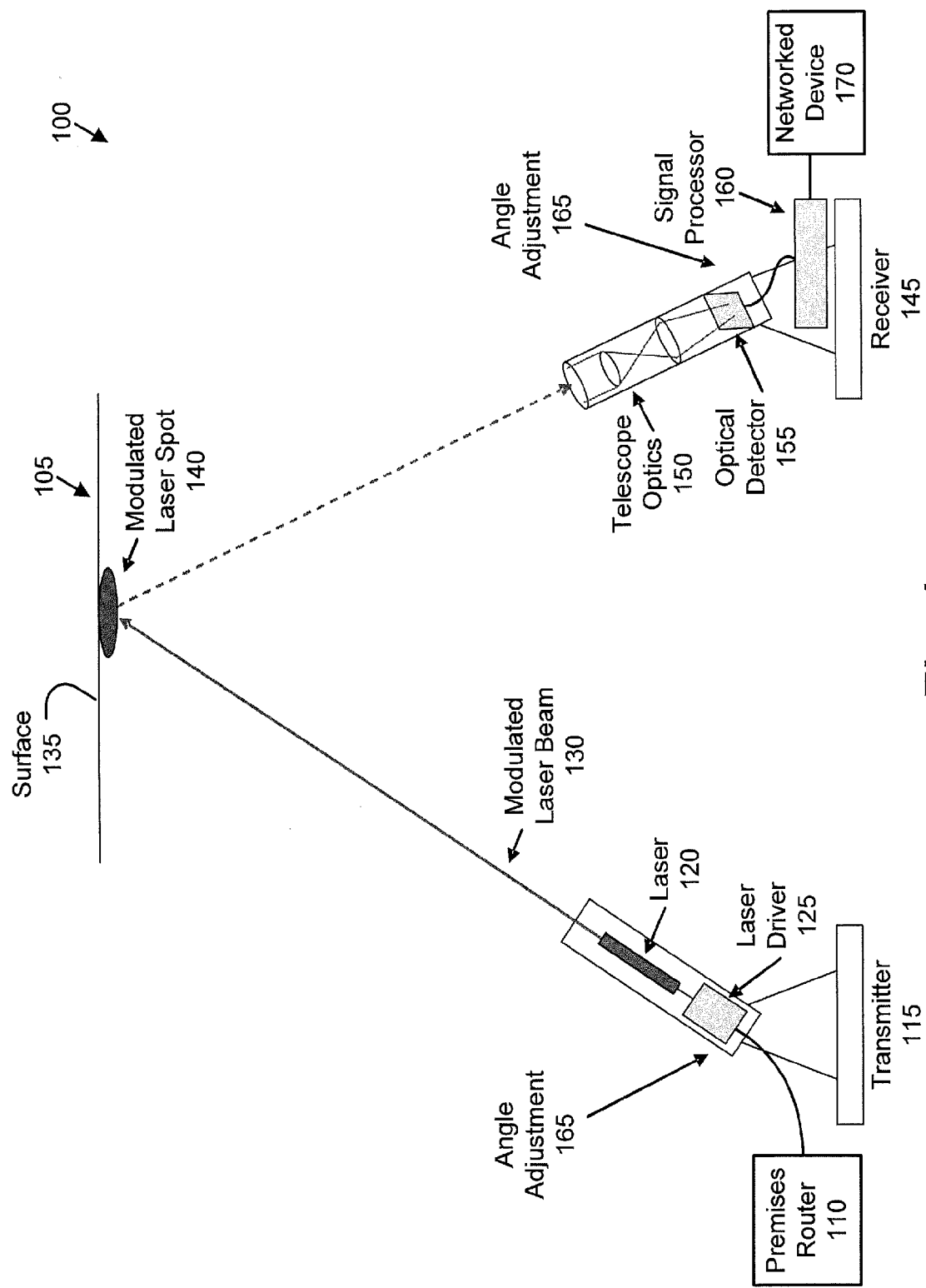
FIG. 1 illustrates an exemplary transmitter and receiver for use in a free-space optical networking system.

FIG. 1 illustrates an exemplary premises 105 including a transmitter 115 and a receiver 145 for use in a free-space optical networking system 100. As illustrated in the Figure, the transmitter 115 may be connected to a premises router 110, and may include a laser 120 and a laser driver 125 configured to modulate input data onto a laser beam 130. The laser beam 130 may project a modulated laser spot 140 onto a surface 135. A receiver 145 may include telescope optics 150 focused on the surface 135 and optically coupled to an optical detector 155, wherein the optical detector 155 may convert the received light into raw data, and a signal processor 160 may decode the raw data into the original input data. The original input data may then be passed to a networked device 170. Additionally, angle adjustments 165 may be used to align the transmitter 115 and the receiver 145. System 100 may take many different forms and include multiple and/or alternate components and facilities. While an exemplary system 100 is shown in FIG. 1, the exemplary components illustrated in Figure are not intended to be limiting. Indeed, additional or alternative components and/or implementations may be used.

A premises 105 may include land and one or more structures, such as a home, a business, or a multiple-dwelling unit (MDU). A premises router 110 may connect a network on the premises 105 to an outside communications network or networks, such as the public switched telephone network (PSTN), a Voice over IP (VOIP) network, a cellular telephone network, or the Internet. For example, the premises router 110 may connect the premises 105 network to an optical network terminal installed at the premises 105 and in selective communication with a fiber-optic communications network.

The premises router 110 may be configured to route and forward information between the in-premises network and the outside communications network. Accordingly, the premises router 110 may provide communications services, including voice calling and packet-switched network services (e.g., Internet access and VoIP communication services), to at least one networked device 170 (e.g., a computer, a mobile phone, a set top box, a television, etc.) in selective communications with the premises router 110. A networked device 170 may be connected to the premises router 110 directly, or may be connected to the premises router 110 through a communications network, such as a radio-frequency (RF) wireless communication network or a free-space optical networking system 100.

The transmitter 115 may include a laser 120 configured to operate as a light source. A laser 120 is a device that may emit light or other forms of electromagnetic radiation through simulated emission. A laser may generally be a light source configured to provide a spatially coherent low-divergence beam of light energy for a particular band of wavelengths. Accordingly, a laser may provide a beam of coherent light and function as a light source. Exemplary laser 120 types may include a semiconductor light-emitting diode (LED) laser, a gas laser, a dye laser, a chemical laser, etc. Exemplary laser 120 wavelengths may include wavelengths of 1310 nm, 1490 nm, 1550 nm, and 1625 nm.

A laser driver 125 may be used to manipulate the laser 120, and may be configured to modulate a signal onto a laser beam 130. In some instances, input data may be modulated onto a laser beam as a determined sequence of pulses of relatively greater and lesser intensity. The laser driver 125 may be connected to the laser 120, and may manipulate the laser 120 according to received input data. As an example, the laser driver 125 may receive input data to be modulated from the premises router 110. Depending on the data being input, the laser driver 125 may be used to modulate a beam comprising video, voice, data, secure keys, or any other form of data transmission. The laser driver 125 may further receive settings regarding the modulation, such as pulse width, bit rate, and compression. Based in part on the settings, the laser driver 125 may modulate the beam at a selected data rate, such as 100 Mbit/sec, 2.5 Gbit/sec, 10 Gbit/sec, 40 Gbit/sec, among other data rates.

When a light source such as a laser 120 or flashlight is directed toward a surface 135, an area of relative light intensity may be apparent on the surface 135. If the surface 135 is smooth, spectral reflection may occur, in which light from a single incoming direction may substantially be reflected into a single outgoing direction. A mirror is an example of a surface 135 providing for spectral reflection. However, if the surface 135 is rough or granular, diffuse reflection may occur, in which light may be reflected in many different directions due to the irregular nature of the surface 135. A diffuse reflection may appear as a spot of intensity on a surface 135, and may be visible from multiple different viewing angles. As an example, a modulated laser spot 140 may be visible as a diffuse reflection of a laser beam onto a surface 135.

The telescope optics 150 of a receiver 145 may include one or more lenses configured to focus light. Specifically, the telescope optics 150 may be configured to focus upon a portion of a surface 135 onto which one or more modulated laser spots 140 are being directed. Through use of the telescope optics 150, light that may be diffusely reflected from a portion of the surface 135 may be concentrated and focused onto an optical detector 155 element for detection. For example, diffused light from the modulated laser spots 140 may be converted into substantially parallel rays by a collimator lens and then converged onto an optical detector 155 by an objective lens. In some examples, a filter may further be included in the telescope optics 150 to reduce interference by blocking wavelengths of light other than the wavelength of the modulated laser spot 140.

The optical detector 155 may be optically coupled to the telescope optics 150, and may be configured to convert the received modulated laser spot 140 into electrical data. In some examples, the optical detector 155 may be a photodiode, such as a silicon PN junction or a PIN junction photodiode. Light from the modulated laser spot 140 may accordingly be focused on the photodiode. Then, when a photon of sufficient energy may strike the photodiode, an electron may become excited, creating an electron-hole pair and producing a photocurrent. As another example, the optical detector 155 may be a photoresistor, which may be a resistor whose resistance decreases with increasing incident light intensity. A photoresistor such as a cadmium sulfide cell, lead sulfide cell, or indium antimonide cell may accordingly be used as an optical detector 155. In still other examples the optical detector 155 may include a charge-coupled device (CCD), where an image is projected using the telescope optics 150 onto a capacitor array of the CCD, causing each capacitor to accumulate an electric charge proportional to the light intensity at that location. These charges may be translated into a sequence of voltages, sampled, digitized, and stored in a memory.

A signal processor 160 may be in selective communication with the optical detector 155, and may sample, digitize, and determine an original data input based on the raw data received from the optical detector 155. The signal processor 160 may include computing hardware and software and may use techniques such as digital signal processing and error checking to aid in the determination of the original data input from the received raw data. The original data input may be determined by the signal processor 160, and may then be forwarded on to a networked device 170.

To align the system, an angle adjustment 165 may allow for the aiming of the modulated laser beam 130 produced by the transmitter 115 and accordingly for the aiming of location of the modulated laser spot 140. For example, the laser 120 and laser driver 125 elements of the transmitter 115 may be mounted inside a hollow member connected to a base portion of the transmitter 115 by a swivel joint. The swivel joint may allow for a range of positioning of the member including the laser 120. The swivel joint may further include a locking mechanism such as an exposed screw, that when engaged against the joint may allow for locking of the member into a desired position. A similar angle adjustment 165 may be included by the receiver 145 and may be configured to aim the receiver to best view the modulated laser spot 140. Through use of the angle adjustments 165, a transmitter 115 and receiver 145 may be aligned to create a free space optical connection. Accordingly, an input signal may be sent from a premises router 110 to a networked device 170 over the free space optical connection.

In general, computing systems and/or devices, such as the laser driver 125 and the signal processor 160, may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other known computing system and/or device.

Computing devices such as the laser driver 125 and the signal processor 160 generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
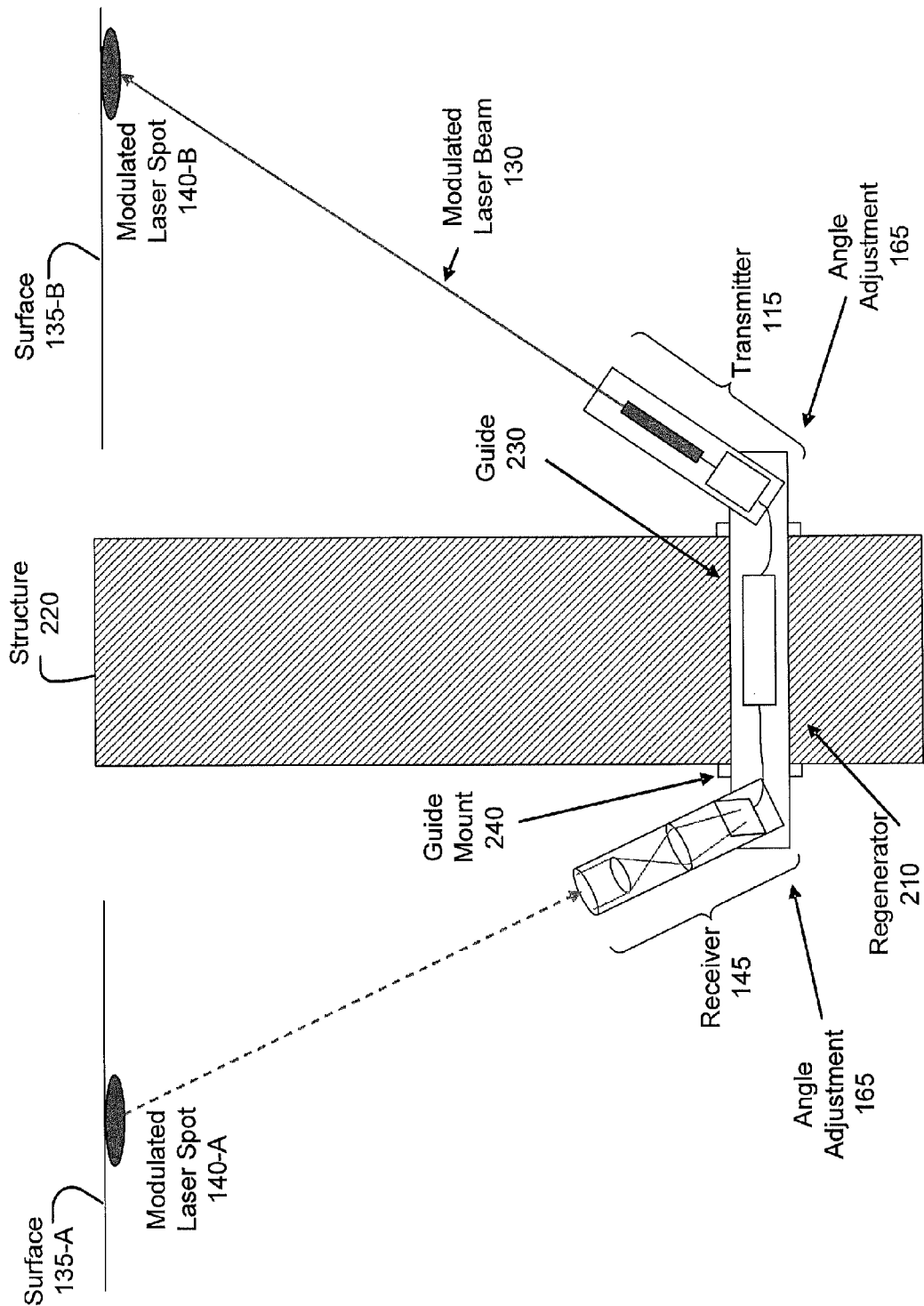
FIG. 2 illustrates an exemplary regenerator for use in a free-space optical networking system.

FIG. 2 illustrates an exemplary regenerator 210 for use in a free-space optical networking system. The regenerator 210 may include a transmitter 115 and a receiver 145, where the transmitter 115 and receiver 145 are each connected to opposite ends of a guide member 230 suitable for mounting to a structure 220 of a premises 105.

Similar to as discussed above, the receiver 145 portion of the regenerator 210 may be configured to receive light diffused from a modulated laser spot 140-A on a surface 135-A and to decode the light into the original data.

More specifically, a laser driver 125 may be used to modulate a signal onto a laser beam 130, such as by way of a sequence of pulses of relatively greater and lesser intensity. For example, a pulse of greater intensity may represent a binary "1", while a pulse of lesser intensity may represent a binary "0". These pulses may result in variations in the intensity of diffused light reflected from a modulated laser spot 140 on a surface 135. Telescope optics 150 included in the receiver 145 portion of the regenerator 210 may receive the varying light reflected from the modulated laser spot 140 on the surface 135, and may focus at least a portion of the light onto an optical detector 155 included in the receiver 145. The optical detector 155 may accordingly convert the received light of varying intensity into an electrical signal, such as varying current, resistance, or sequence of voltages. This raw data from the optical detector 155 may then be sent to a signal processor 160, which may determine an original data input based on the raw data. For example, a raw data signal indicating received light above a particular threshold intensity value may be determined to indicate a binary "1", while a raw data signal indicting received light below the threshold value may be determined to indicate a binary "0".

The transmitter 115 portion of the regenerator 210 may be configured to create a modulated laser spot 140-B on a surface 135-B. However, rather than the transmitter 115 receiving a data input from a premises router 110 and the receiver 145 providing an output to a networked device 170 discussed above, the original data input determined by the receiver 145 may instead be used as the input to the transmitter 115. Accordingly, through use of the receiver 145 and the transmitter 115 in combination, the regenerator 210 may operate as a repeater of a data input modulated over a laser beam 130.

While in some instances converting received light into an electrical signal and back may provide a cleaner signal, depending on the amount of degradation of the received light such a conversion may not be required. As an example, rather than converting received light into an electrical signal, received light may be used to feed an optical amplifier, may be transmitted through the wall over a fiber, and may be retransmitted, such as through use of telescope optics 150 focused on an appropriate surface 135.

The structure 220 may be an object relatively fixed in position, such as a part of a constructed building. For example, a structure 220 may include a wall or support of a building of a premises 105. The regenerator 210 may be mounted to the structure 220, such that the transmitter 115 and receiver 145 portions on the regenerator 210 may be aimed at appropriate surfaces 135.

In some examples, the regenerator 210 may be mounted through a bore of sufficient diameter through a portion of the structure 220, such as through a wall. The diameter of the bore may be of sufficient diameter to allow for a guide member 230 of the regenerator 210 to freely pass. Additionally, to allow for safe passage of the regenerator 210 through the bore, one or more of the transmitter 115 and receiver 145 may be adjusted through use of the angle adjustment 165 to be substantially parallel to the guide member 230. For example, the transmitter 115 portion of the regenerator 210 may be adjusted to be substantially parallel to the guide member 230 and pointing outward and away from the receiver 145 end. Then, the transmitter 115 and a portion of the guide member 230 may be passed through the bore. A guide mount 240, such as a guide ring, may be utilized to fix the regenerator 210 in place, thus allowing for the transmitter 115 and receiver 145 portions of the mounted regenerator 210 to be aimed at appropriate surfaces 135. As an example, once the regenerator 210 is mounted, the transmitter 115 may again be adjusted through use of the angle adjustment 165 to direct a modulated laser beam 130 at a suitable surface 135-B. Accordingly, free-space optical communication between areas of the premises 105 unreachable by a clear line-of-sight may be possible through use of the regenerator 210 mounted through a portion of the structure 220.

Figure 3:
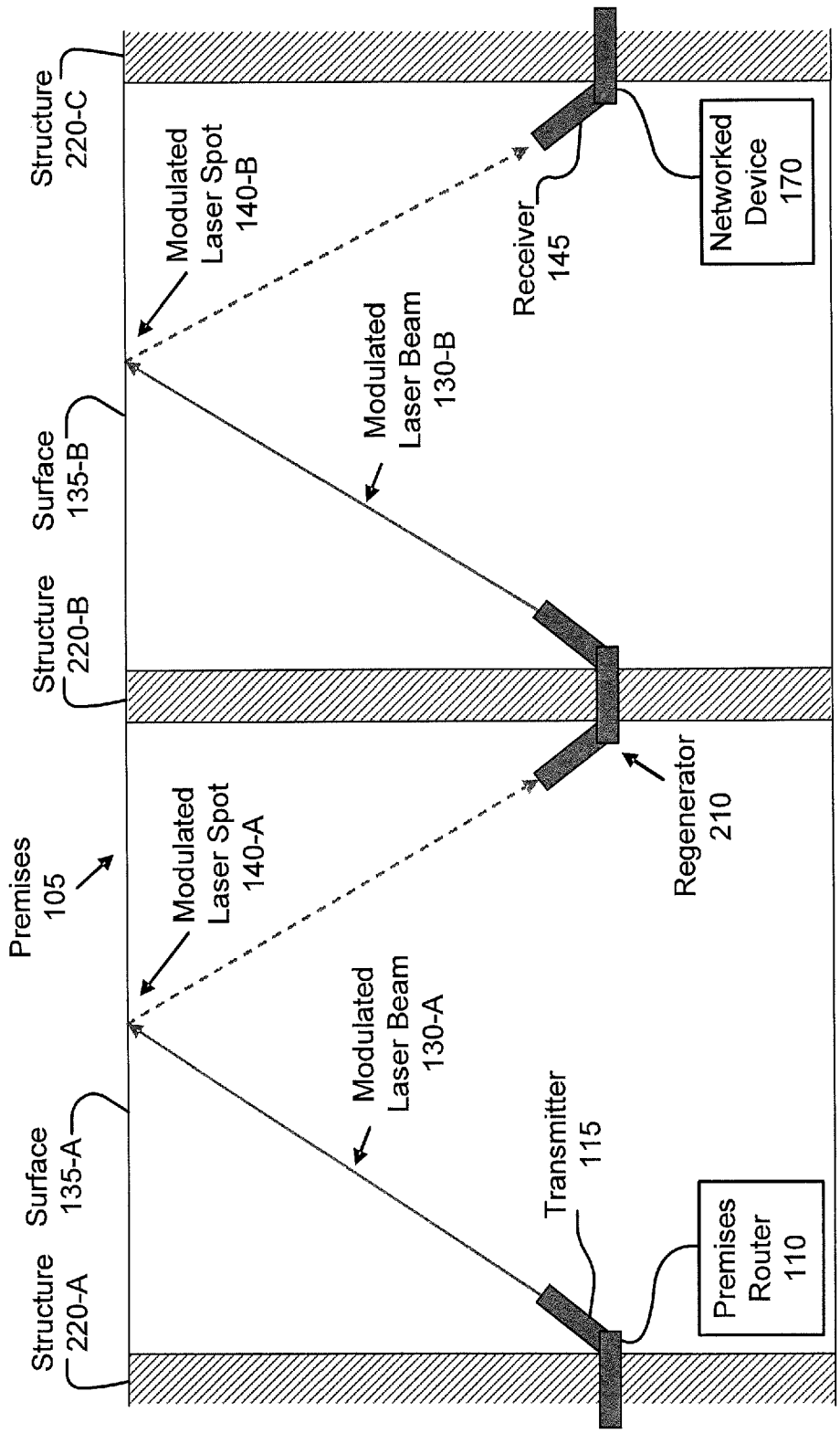
FIG. 3 illustrates an exemplary free-space optical networking system including a transmitter, a regenerator, and a receiver.

FIG. 3 illustrates an exemplary free-space optical networking system in a premises 105 including a premises router 110, a transmitter 115, a regenerator 210, a receiver 145, and a networked device 170.

As illustrated, a premises router 110 may be connected to a transmitter 115 and may provide input data to be sent to a networked device 170 over the free-space optical network. The transmitter 115 may be mounted to structure 220-A and may modulate the signal over a modulated laser beam 130-A directed at a surface 135-A. The regenerator 210 may mounted through structure 220-B and may be configured to receive a portion of the laser beam 130-A reflected at modulated laser spot 140-A, and to decode the light into the original input data. The regenerator may further be configured to transmit the decoded input data over a modulated laser beam 130-B directed at a surface 135-B. The receiver 145 may be mounted to structure 220-C and may be configured to receive a portion of the laser beam reflected at modulated laser spot 140-B, to decode the light into the original input data, and to send the decoded input data to the networked device 170.

Figure 4:
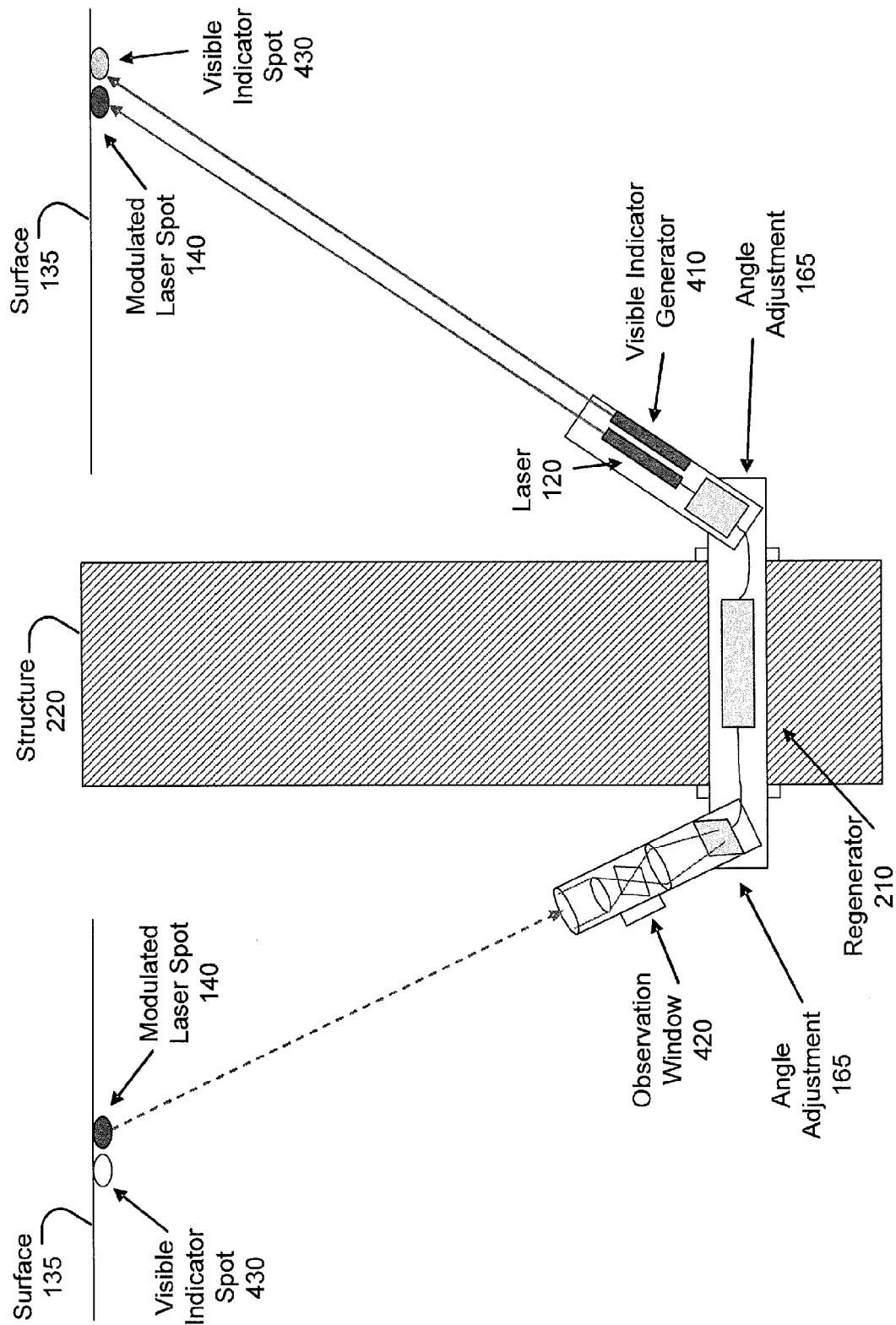
FIG. 4 illustrates an exemplary regenerator incorporating functionality for assisting in alignment of the regenerator.

FIG. 4 illustrates an exemplary regenerator 210 incorporating functionality for assisting in the alignment of a regenerator 210. As illustrated, the transmitter 115 portion of the regenerator 210 may include a visible indicator generator 410, and the receiver 145 portion of the regenerator 210 may include an observation window 420. These elements may be used in combination with the angle adjustments 165 to aid in the alignment of a transmitter 115 with a corresponding receiver 145.

The visible indicator generator 410 may be configured to produce a beam sufficiently collimated to allow for an optical alignment of a transmitter 115 with a receiver 145. As some examples, the visible indicator generator 410 may be a visible light laser such as a 650 nm red laser or a 532 nm green laser of sufficient brightness to be visible. The visible indicator generator 410 may be selectively activated by an operator to allow for alignment of a transmitter 115 with a corresponding receiver 145.

In some instances, the visible indicator generator 410 may configured to produce an output beam substantially parallel to and in close proximity to or a fixed distance away from the laser beam produced by laser 120. Accordingly, the visible indication generator 410 may produce a visible indicator spot 430 on a surface 135 at substantially the same or a known distance away from the location of the modulated laser spot 140.

The observation window 420 may be an optical sight or scope and may be configured to allow for an operator to view through the observation window 420 and locate the visible indicator spot 430. Accordingly, when the visible indicator spot 430 is viewable through the observation window 420, then the corresponding receiver 145 may accordingly be in a suitable alignment with the modulated laser spot 140. Once the corresponding receiver 145 and transmitter 115 are determined to be in a suitable alignment, the visible indictor generator may be deactivated. In some instances, the receiver 145 may further include a signal strength indicator to facilitate the alignment process, such as a light-emitting diode. As an example, the light-emitting diode may be configured to display a visual indication corresponding to the received signal strength, such that relatively greater received signal strength may be indicated as increased brightness of the signal strength indicator.

Figure 5:
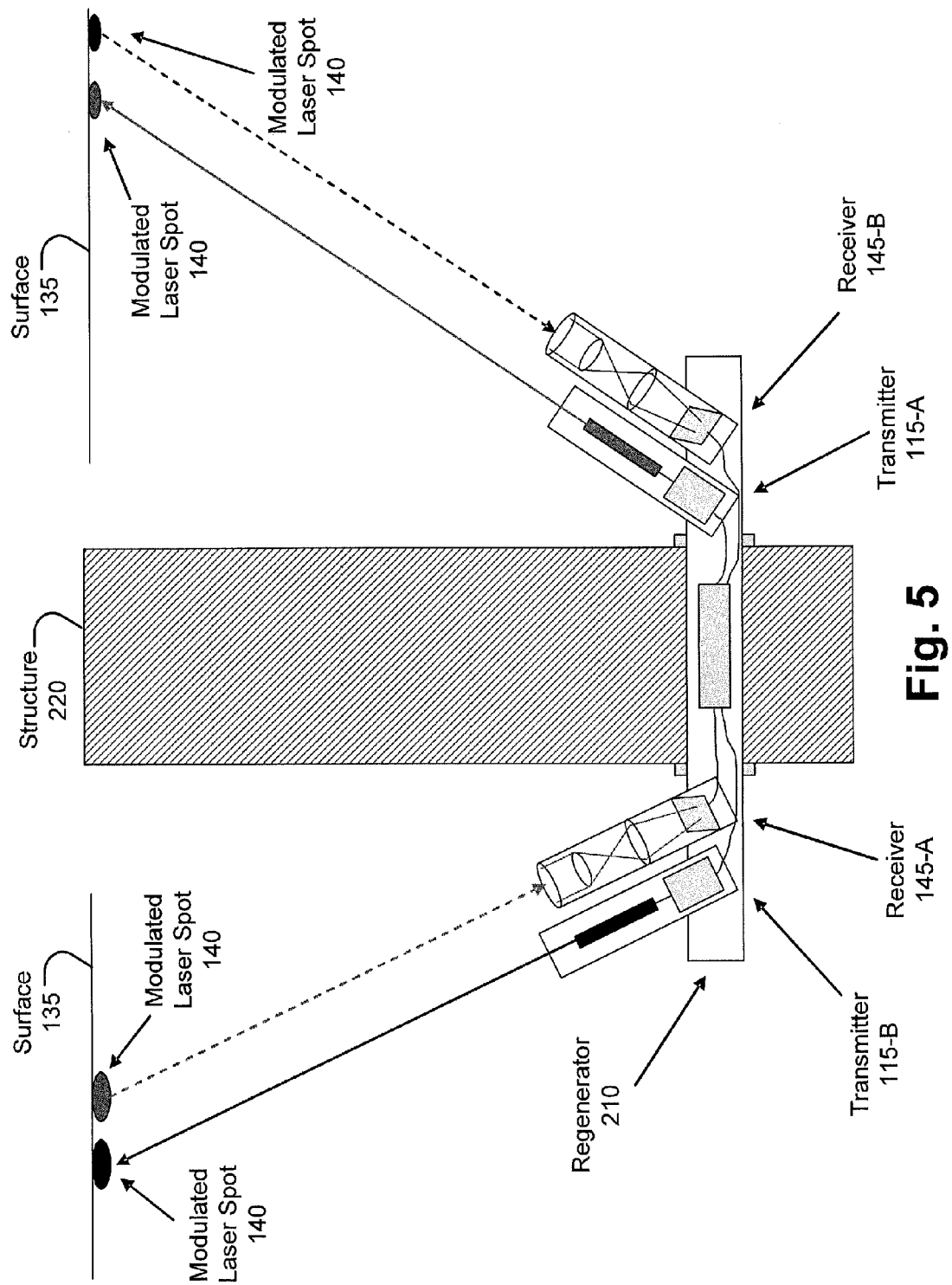
FIG. 5 illustrates an exemplary duplex regenerator for use in a duplex free-space optical networking system.

FIG. 5 illustrates an exemplary duplex regenerator 210 for use in a duplex free-space optical networking system. To allow for two-way free-space optical communication, the regenerator 210 may include a plurality of transmitters 115 and a plurality of receivers 145 pairs.

As shown in FIG. 5, one end of a regenerator 210 may have a transmitter 115-B and a receiver 145-A. Additionally, the other end of the regenerator 210 may have a transmitter 115-A and a receiver 145-B. The receiver 145-A may receive and decode a data input and may repeat the data input through use of transmitter 115-A. Likewise a receiver 145-B may receive and decode a second data input and may repeat the data input through use of transmitter 115-B. Accordingly, through use of the two transmitter 115 and receiver 145 pairs, two-way communications may be provided by a regenerator 210.

To minimize interference between the two directions, the transmitters and receivers may operate on different wavelengths. For example, transmitter 115-A may operate on a first wavelength such as 1625 nm, and transmitter 115-B may operate on a second wavelength such as 1550 nm. To avoid interference, receiver 145-B may include a filter that filters out light of a 1550 nm wavelength, and receiver 145-A may include a filter that filers out light of a 1625 nm wavelength. Using such a multiple wavelength and filtering approach, substantially the same portion of surface 135 may be utilized by both directions of the free-space optical communications system. In other words, the multiple wavelength and filtering approach may allow for one or more of the modulated laser spots 140 to substantially overlap.

Figure 6:
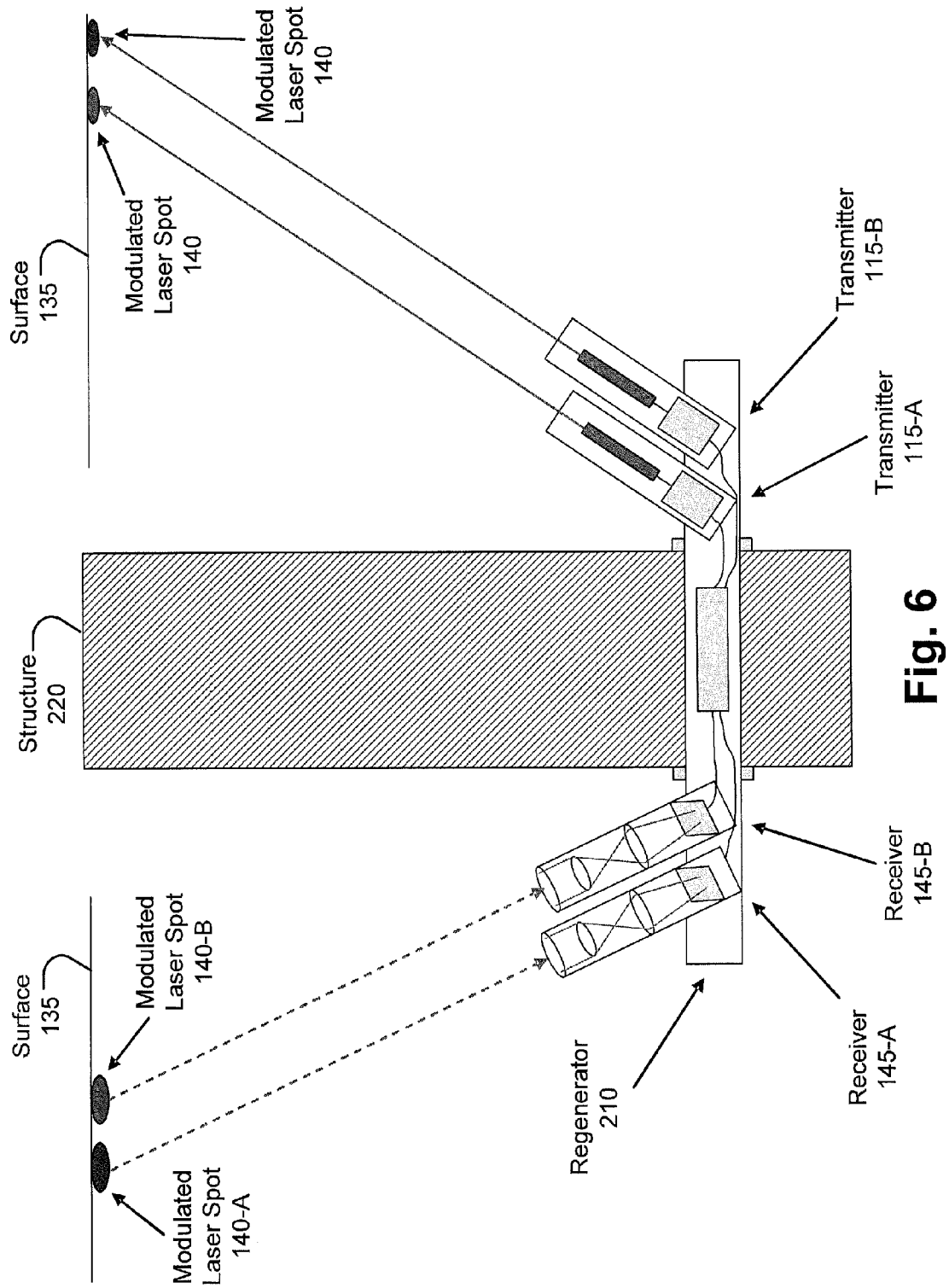
FIG. 6 illustrates an exemplary regenerator providing multiple parallel free-space optical paths.

FIG. 6 illustrates an exemplary regenerator 210 providing multiple parallel free-space optical paths. As illustrated in the Figure, an exemplary regenerator 210 may include a plurality of receivers 145 on one end (i.e., receivers 145-A and 145-B), and a plurality of transmitters 115 on the other end (i.e., transmitters 115-A and 115-B). While two receivers 145 and two transmitters 115 are shown in FIG. 6, additional receivers 145 and transmitters 115 may be utilized. For example, another exemplary regenerator 210 may include seven receivers 145 and five transmitters 115.

The multiple parallel paths may be used to transmit the same data to provide redundant paths. In some instances, an original signal may be fed to a plurality of transmitters 115, where each transmitter may modulate substantially same signal onto a laser and project the beam onto a modulated laser spot 140. A regenerator 210 may accordingly use a plurality of receivers 145 to attempt to receive the signals modulated over each of the modulated laser spots 140. Therefore, if one of the modulated laser spots 140 becomes obstructed (such as by a fan blade, an individual blocking a modulated laser beam 130, interference from the sun, etc.), the signal may still be received by the regenerator 210.

For example, a regenerator 210 may include a receiver 145-A configured to receive a signal from modulated laser spot 140-A and a receiver 145-B configured to receive a signal from modulated laser spot 140-B. If modulated laser spot 140-A is blocked, then the signal may still be received by the regenerator 210 through use of the receiver 145-B and modulated laser spot 140-B. As another example, the regenerator 210 may include transmitters 115-A and 115-B, where each transmitter 115 may modulate the same signal onto a modulated laser beam 130.

In some instances, a regenerator 210 including multiple transmitters 115 and receiver 145 may be used to increase throughput. For example, transmitters 115-A and 115-B may each send a unique data input, and receivers 145-A and 145-B may each receive a unique data input. Accordingly, the throughput of the regenerator 210 including two transmitters 115 and two receivers 145 is effectively doubled over a regenerator 210 including only one transmitter 115 and one receiver 145. However, if one of the modulated laser spots 140 is blocked, then that particular data being modulated over the spot 140 may not be received by the regenerator 210.

Figure 7:
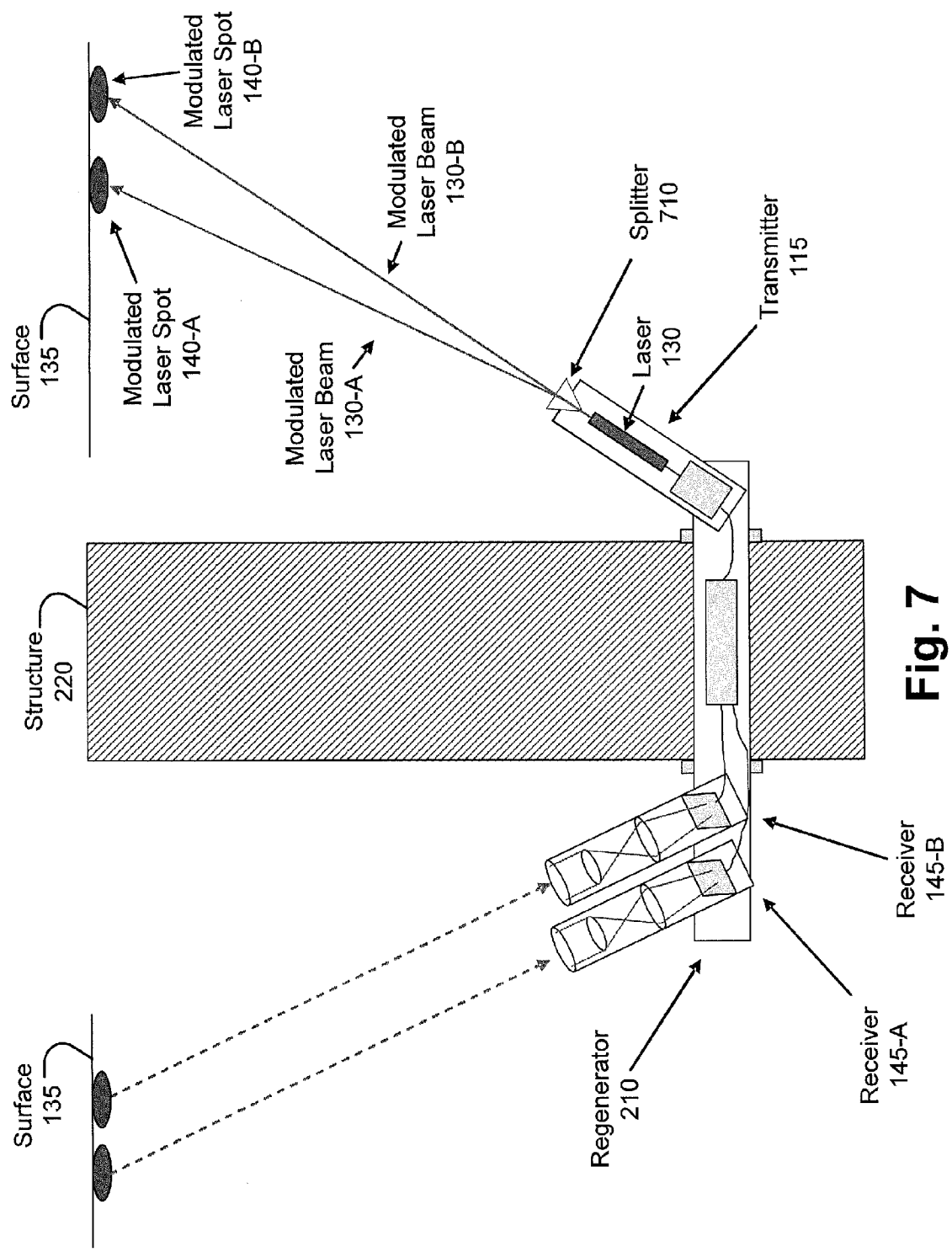
FIG. 7 illustrates an exemplary regenerator including a splitter configured to split a modulated laser beam into multiple modulated laser beams.

FIG. 7 illustrates an exemplary regenerator 210 including a splitter 710 configured to split a modulated laser beam 130 into multiple modulated laser beams 130.

The laser 120 included in the transmitter 115 portion of the regenerator 210 may be optically coupled to an optical splitter 710, such as through a fiber optic cable or through free space transmission. The optical splitter 710 may split the energy of a beam of light into multiple beams of light through energy divergence. Through use of the splitter 710, a single transmitter 115 may be used to provide multiple redundant modulated laser beams 130 and modulated laser spots 140. Accordingly, through use of a regenerator 210 including a splitter 710, multiple redundant modulated laser spots 140 may be directed at a surface 135 though use of a single transmitter 115-A.

Figure 8:
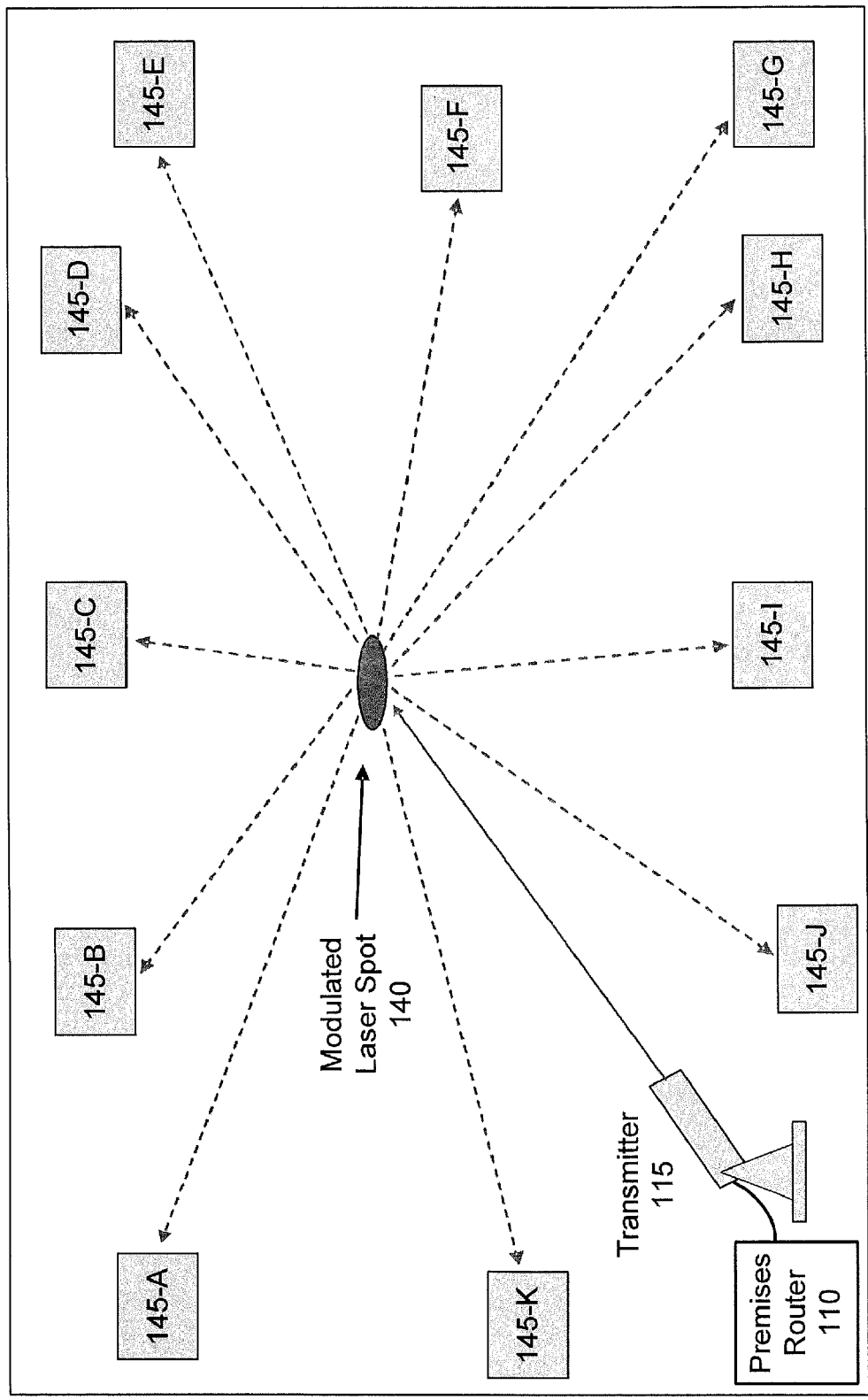
FIG. 8 illustrates an exemplary broadcast free-space optical networking system.

FIG. 8 illustrates an exemplary broadcast free-space optical networking system including a premises router 110, a transmitter 115, and a plurality of receivers 145A-K in a premises 105. While FIG. 8 illustrates eight receivers 145, systems including more or fewer receivers 145 are possible and likely.

The transmitter 115 may receive input data from a premises router 110. The transmitter 115 may further provide a modulated laser beam 130 onto which the input data may be modulated. The modulated laser beam 130 may be directed at a surface 135 of the premises 105 which may accordingly produce a modulated laser spot 140 on the surface 135.

Light reflected off of a surface 135 at the modulated laser spot 140 may be viewable by a plurality of receivers 145A-K. Accordingly, each of receivers 145A-K may receive a portion of the diffuse light reflected off of the surface 135, and thus may determine the original input data. Accordingly, a broadcast free-space optical network may be created in which a single transmitter 115 may effectively broadcast input data to a plurality of receivers 145.

Figure 9:
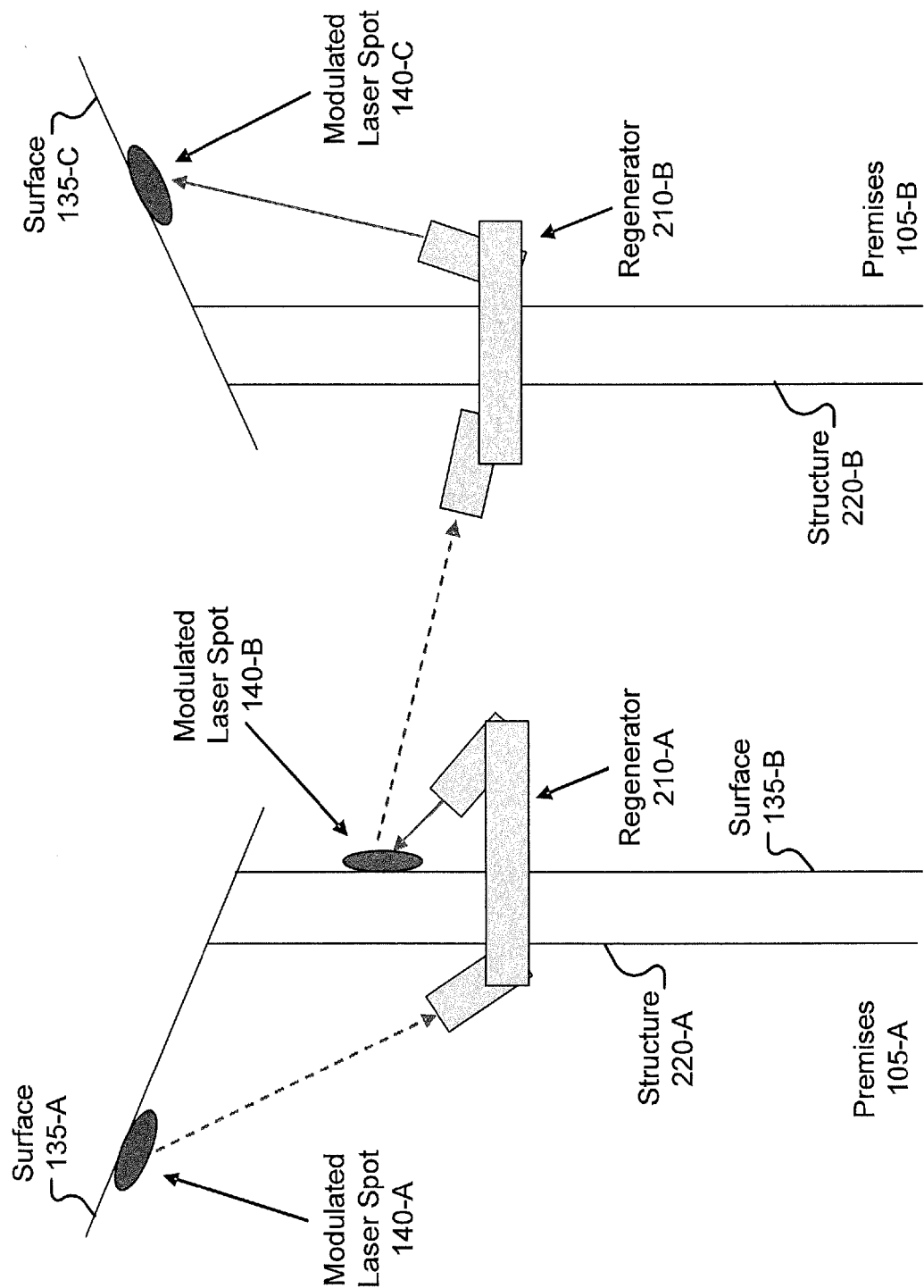
FIG. 9 illustrates an exemplary free-space optical networking system between structures.

FIG. 9 illustrates an exemplary free-space optical networking system between two premises 105.

As illustrated, a regenerator 210-A mounted on a structure 220-A may receive and decode input data from a modulated laser spot 140 on a surface 135-A of premises 105-A. The regenerator 210-A may accordingly modulate the input data over a laser beam 130 and produce a modulated laser spot 140-B on surface 135-B of the premises 105-A. A regenerator 210-B mounted on a structure 220-B of premises 105-B may receive and decode the input data of modulated laser spot 140-B. The regenerator 210-B may further modulate the input data over a laser beam 130 and produce a modulated laser spot 140-C.

Figure 10:
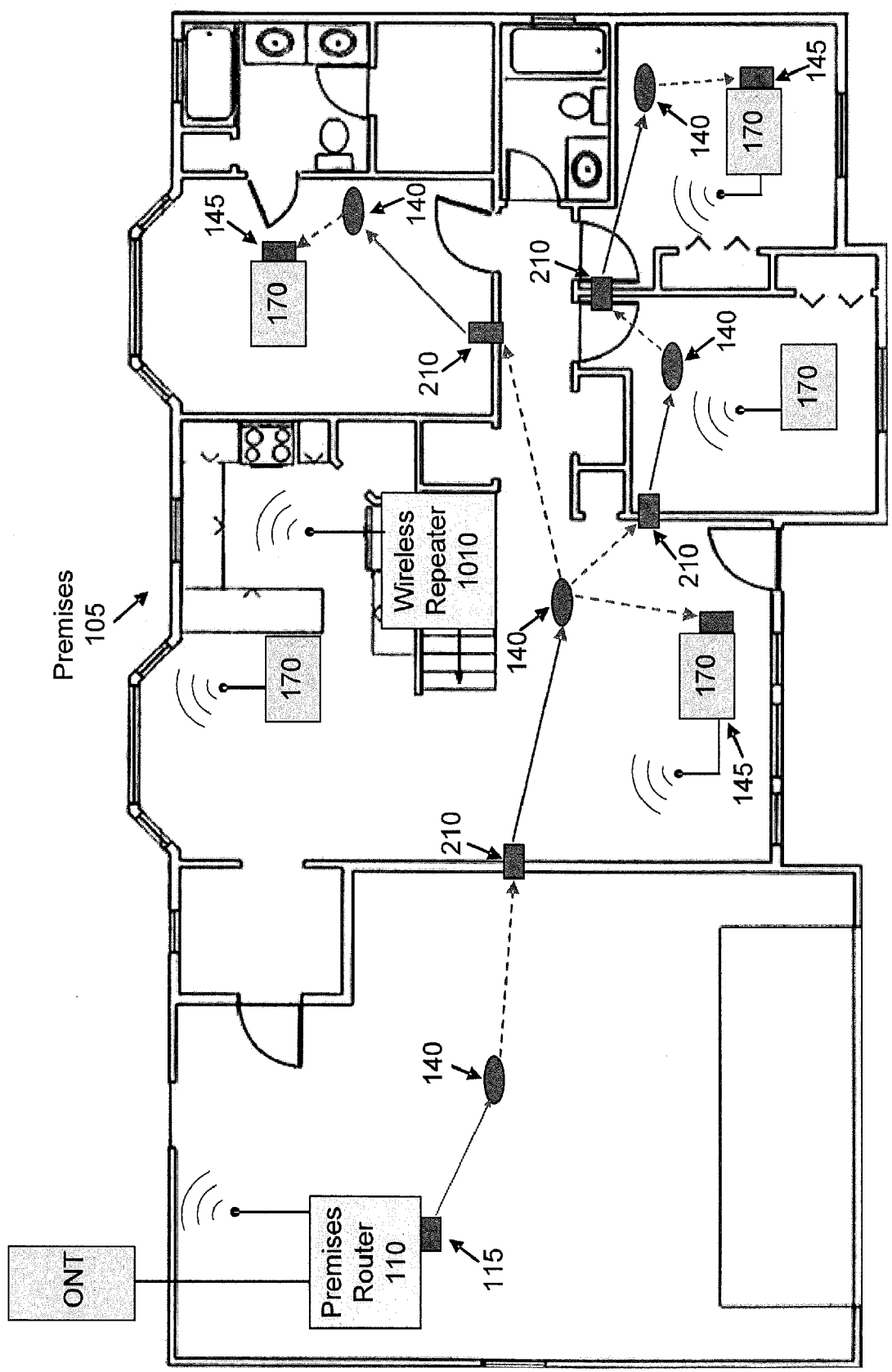
FIG. 10 illustrates an exemplary duplex free-space optical networking system utilizing wireless upstream networking.

FIG. 10 illustrates an exemplary duplex free-space optical networking system utilizing wireless upstream networking. As illustrated in the Figure, a premises 105 may include a premises router 110, a transmitter 115, a plurality of regenerators 210, a plurality of receivers 145, a plurality of networked devices 170, and a wireless repeater 1010.

The premises router 110 may be in communication with an outside network, such as in communication with a fiber-to-the-premises network through use of an optical network terminal (ONT). The premises router 110 may further include wireless networking functionality and also free-space optical networking functionality to facilitate duplex communication with the plurality of networked devices 170 and the outside network. As shown in the Figure, downstream network communication may utilize a free-space optical network including a transmitter 115, a plurality of regenerators 210, and a plurality of receivers 145. Additionally, upstream communication may utilize the wireless communications network.

In some instances, where one or more networked devices 170 may be located beyond the reach of the wireless network provided by the premises router 110, a wireless repeater 1010 may be required. The wireless repeater 1010 may receive and repeat wireless networking traffic, thereby enlarging the effective wireless range of the premises router 110. Accordingly, the wireless repeater 1010 may be configured to extend the range of the wireless network.

The plurality of networked devices 170 may be devices such as discussed above. For example, a networked device 170 may include a set top box connected to a display device. As another example, a networked device 170 may be a portable or desktop computer. Accordingly, through use of the free-space optical network and wireless network the plurality of networked devices 170 may be in communication with the outside network.

In some instances, a networked device 170 may request a particular video feed over the wireless network, and may receive the requested video feed over the free-space optical network. Accordingly, the networked device 170 may make use of the broadband capacity of the free-space optical network to receive the video feed. In other instances, a portion of the networked devices 170 may additionally or alternately use the wireless network for some or all of downstream communications. As an example, the free-space optical network may be reserved for video feed data, while web browsing traffic may be routed over the wireless network.

Figure 11:
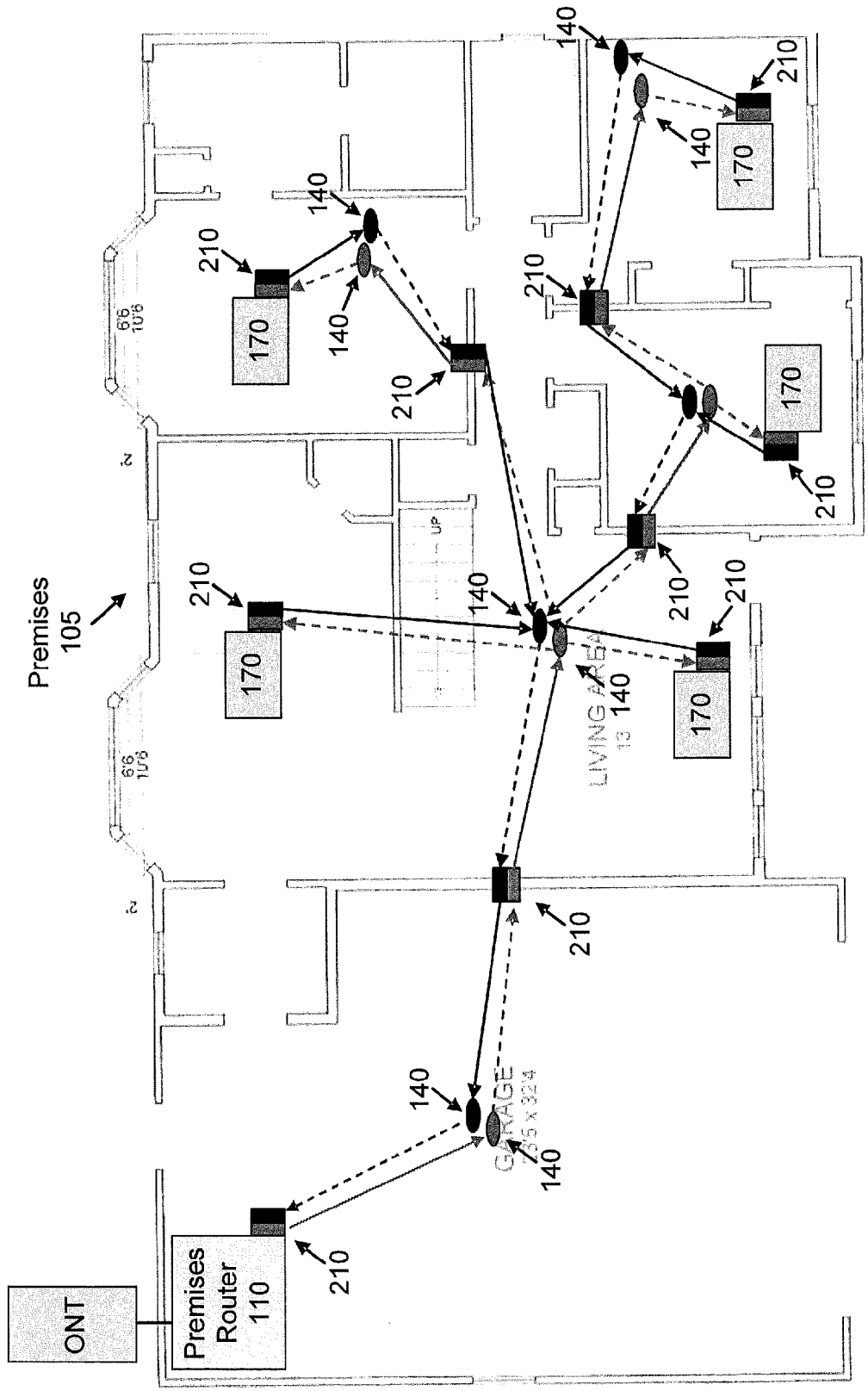
FIG. 11 illustrates an exemplary duplex free-space optical networking system utilizing free-space optical upstream networking.

FIG. 11 illustrates an exemplary duplex free-space optical networking system utilizing free-space optical upstream networking. As illustrated in the Figure, a premises 105 may include a premises router 110, a plurality of networked devices 170, and a plurality of regenerators 210 configured for duplex operation. Through use of the duplex free-space optical network, both downstream and upstream broadband communications may be provided through the premises 105.

For example, as discussed above, downstream and upstream communications may be performed by regenerators 210 as illustrated in FIG. 5, wherein the regenerators 210 may use a first wavelength laser to perform downstream communication and a second wavelength laser to perform upstream communication.

Because the upstream links may have multiple sources each configured to transmit to a single surface 135 location, a collision management mechanism may be implemented to address potential networking collisions where multiple regenerators 210 attempt to transmit to a single modulated laser spot 140 simultaneously. As an example of a collision, two regenerators 210 may simultaneously attempt to transmit data via the same modulated laser spot 140, and corrupted data may be received by a regenerator 210 focused on the modulated laser spot 140 and configured to receive the data. The receiving regenerator 210 may detect the corrupted data, and may request for each of the two transmitting regenerators 210 to retransmit. Each of the two transmitting regenerators 210 may then delay for a random period before attempting retransmission. An exemplary collision management system, similar to the collision management system of Ethernet disclosed in the IEEE standard 802.3, may accordingly be implemented over a free-space optical networking system.

Figure 12:
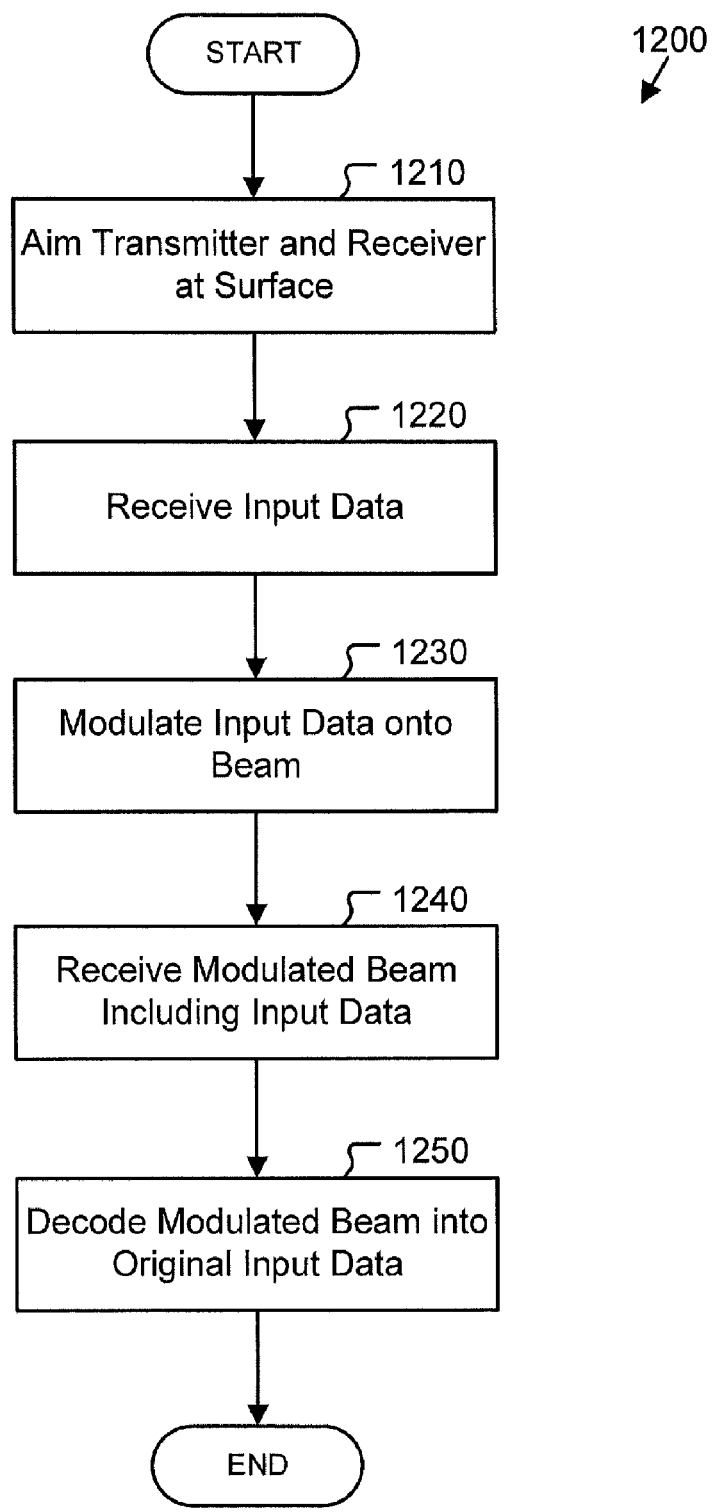
FIG. 12 illustrates an exemplary process flow for free-space optical network transmission.

FIG. 12 illustrates an exemplary process flow 1200 for free-space optical network transmission.

In block 1210, a transmitter 115 and a receiver 145 are each aimed at a surface 135 of a structure 220. For example, the transmitter 115 and the receiver 145 may each be mounted to a structure 220, such that the transmitter 115 and receiver 145 portions on the regenerator 210 may be aimed at a surface 135, such as through use of angle adjustments 165. The receiver 145 may use telescope optics 150 to focus on the surface 135 at a location substantially where a modulated laser beam 130 from the transmitter 115 may be directed.

In block 1220, the transmitter 115 receives input data from a data source. For example, the transmitter 115 may receive input data from a premises router 110 in selective communication with an outside network. As another example, the transmitter 115 may receive input data from a receiver 145.

In block 1230, the transmitter 115 modulates the data signal onto a laser beam 130 through use of a laser 120 and a laser driver 125. As an example, the laser driver 125 may modulate input data onto the laser beam 130 of the laser 120 as a determined sequence of pulses of relatively greater and lesser intensity. The laser driver 125 may further receive settings regarding the modulation, such as pulse width, bit rate, and compression. Based in part on the settings, the laser driver 125 may modulate the beam 130 at a selected data rate.

In block 1240, the receiver 145 receives the modulated signal. For example, the receiver 145 may include telescope optics 150 configured to focus upon a portion of a surface 135 onto which one or more modulated laser spots 140 are being directed, where the telescope optics 150 may concentrate and focus light reflected off the modulated laser spot 140 onto an optical detector 155 element for detection. In some examples, a filter may further be included in the telescope optics 150 to reduce interference from wavelengths of light other than the wavelength of the modulated laser spot 140.

In block 1250, the receiver 145 decodes the input data. For example, an optical detector 155 included in the receiver 145 may be optically coupled to the telescope optics 150, and may be configured to convert the received modulated laser spot 140 into raw data. A signal processor 160 may be in selective communication with the optical detector 155, and may sample, digitize, and determine an original data input based on the raw data received from the optical detector 155. The decoded input data may be retransmitted or may be sent to a networked device 170.

Next, the process 1200 ends.

Conclusion

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description.

The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
   a transmitter including a laser configured to generate a laser beam directed at a spot on a surface, a laser driver connected to said laser and configured to modulate original input data onto said laser beam, and a visible light indicator generator operating at a different wavelength than said laser and configured to produce a visible light indicator spot on the surface to allow for optical alignment of said transmitter with a receiver; and
   a receiver including an optical detector configured to decode received light into raw data, a signal processor configured to decode said raw data into said original input data, and telescope optics configured to receive light reflected from said spot on said surface and focus at least a portion of said light onto said optical detector.

2. The system of claim 1, wherein said laser produces light at a pre-determined wavelength, and wherein said telescope optics further include a filter configured to block at least a portion of wavelengths of light other than said pre-determined wavelength.

3. The system of claim 1, further comprising a premises router in selective communication with said transmitter and configured to send said input data to said transmitter.

4. The system of claim 1, further comprising a networked device in selective communication with said receiver and configured to receive said decoded original input data.

5. The system of claim 1, wherein said transmitter further comprises a splitter configured to split a modulated laser beam into a plurality of modulated laser beams, each modulated laser beams configured to be directed at a unique spot on said surface.

6. The system of claim 1, wherein said telescope optics include a collimator lens configured to collimate received light and an objective lens configured to converge said received light onto said optical detector.

7. The system of claim 1, wherein the receiver further includes an observation window configured to allow an operator to view through the observation window to locate the visible light indicator spot when the receiver is aligned with the transmitter.

8. A system, comprising:
   a regenerator including:
      a receiver including an optical detector configured to decode received light into raw data, a signal processor configured to decode said raw data into input data, and telescope optics configured to receive light reflected from a spot on a surface, and focus at least a portion of said light onto said optical detector; and a transmitter including a laser configured to generate a laser beam directed at a second spot, a laser driver connected to said receiver and said laser and configured to receive said input data from said receiver and modulate said input data onto said laser beam, and a visible light indicator generator operating at a different wavelength than said laser and configured to produce a visible light indicator spot on the surface to allow for optical alignment of said transmitter with a receiver.

9. The system of claim 8, further comprising:
a premises router configured to provide said input data; and
a second transmitter in selective communication with said premises router and configured to receive said input data from said premises router and generate a modulated laser beam including said input data directed at said spot.

10. The system of claim 8, further comprising:
a second receiver configured to decode received light into input data and optically aligned to receive light from said transmitter; and
a networked device in selective communication with said second receiver and configured to receive said input data.

11. The system of claim 8, wherein said regenerator further comprises a second receiver configured to receive light reflected from a third spot and a second transmitter including a laser configured to generate a laser beam directed at a fourth spot on a surface.

12. The system of claim 11, wherein said regenerator further comprises a guide member to which said transmitters and said receivers are mounted.

13. The system of claim 12, wherein said receiver and said transmitter are connected to one end of said guide member, and said second receiver and said second transmitter are connected to the other end of said guide member.

14. The system of claim 12, wherein said receiver and said second receiver are connected to one end of said guide member, and said transmitter and said second transmitter are connected to the other end of said guide member.

15. The system of claim 11, wherein said laser included in said transmitter is configured to provide a coherent beam of light at a first wavelength and a laser included in said second transmitter is configured to provide a coherent beam of light at a second wavelength distinct from said first wavelength.

16. The system of claim 15, wherein said telescope optics included in said receiver further include a filter configured to block at least a portion of wavelengths of light other than said first wavelength; wherein telescope optics included in said second receiver include a filter configured to block at least a portion of wavelengths of light other than said second wavelength.

17. The system of claim 16, wherein said spot and said second spot substantially overlap, and said third spot and said fourth spot substantially overlap.

18. The system of claim 8, wherein the receiver of the regenerator further includes an observation window configured to allow an operator to view through the observation window to locate the visible light indicator spot when the receiver is aligned with the transmitter.

19. A method, comprising:
receiving input data;
modulating said input data onto a laser beam by way of a laser driver of a transmitter;
directing said modulated laser beam at a spot on a surface of a structure;
activating a visible light indicator generator operating at a different wavelength than said laser beam and producing a visible light indicator spot on the surface;
optically aligning the transmitter with a receiver according to the visible light indicator spot;
receiving said modulated beam including said input data by way of the receiver aligned with the spot on the surface of the structure; and
decoding the modulated beam into the original input data by way of a signal processor.

20. The method of claim 19, further comprising providing the input data by a premises router in selective communication with an outside network.

21. The method of claim 19, further comprising providing the decoded original input data to a networked device.

22. The method of claim 19, further comprising:
modulating the decoded original input data onto a second laser beam;
directing the second modulated laser beam at a second spot;
receiving the second modulated beam including said input data by way of a second receiver aligned with the second spot; and
decoding the second modulated beam into the original input data.

23. The method of claim 19, further comprising:
receiving said modulated beam including said input data by way of a second receiver aligned with the spot on the surface of the structure; and
decoding the modulated beam into the original input data by way of a second signal processor.

24. The method of claim 19, further comprising providing, by an observation window of the receiver, a view through the observation window to allow an operator to locate the visible light indicator spot when the receiver is aligned with the transmitter.

* * * * *